United States Patent [19]
Stiefel et al.

[11] 3,946,974
[45] Mar. 30, 1976

[54] RAILWAY SWITCH CONSTRUCTION FOR SUSPENDED RAILROAD USING TWO-RUNWAY-RAIL SUSPENSION RAILS

[75] Inventors: Christian Stiefel, Aachen; Fritz Frederich, Krefeld, both of Germany

[73] Assignee: Waggonfabrik Uerdingen A.G., Krefeld, Germany

[22] Filed: July 1, 1975

[21] Appl. No.: 592,304

[30] Foreign Application Priority Data
July 3, 1974 Germany............................ 2431867

[52] U.S. Cl............................ 246/415 R; 104/130
[51] Int. Cl.². ........................................ E01B 7/00
[58] Field of Search........... 246/415 R; 104/130, 96, 104/105, 195, 148 LM, 148 MS, 148 SS

[56] References Cited
UNITED STATES PATENTS
3,830,162   8/1974   Marten ............................... 104/130

*Primary Examiner*—Trygve M. Blix
*Assistant Examiner*—Reinhard J. Eisenzopf
*Attorney, Agent, or Firm*—Michael J. Striker

[57] ABSTRACT

A suspended railway employs a suspension rail provided with two runway rails upon which respectively ride the first and second traveller wheel sections of a traveller from which a railway car, or the like, is suspended. A railway switch for the suspension rail has a stem section and two branch sections. Each of the two runway rails of the stem section also forms the outer runway rail of a respective one of the two branch sections. Each of the two branch sections furthermore has a respective inner runway rail. The inner runway rails of the two branch sections define together with the outer runway rails a switch gap over which one of the traveller wheel sections crosses unsupported as the traveller crosses the switch gap, so that in crossing the switch gap the traveller exhibits a tendency to tilt in a first direction towards the unsupported side of the traveller. An arrangement is provided for positively causing the traveller to tilt in the opposite second direction when crossing the switch gap to assure that upon the completion of the crossing of the switch gap the unsupported traveller wheel section will not be below the level of the runway rail onto which it is about to come into contact.

13 Claims, 12 Drawing Figures

RAILWAY SWITCH CONSTRUCTION FOR SUSPENDED RAILROAD USING TWO-RUNWAY-RAIL SUSPENSION RAILS

BACKGROUND OF THE INVENTION

The invention relates to a railway switch for use in suspended railways of the type making use of two-runway-rail suspension track. The two runway rails which form the bearing track for the suspension rail are spaced apart to form a slit. The traveller has a plurality of traveller wheels, arranged one after the other. These traveller wheels are mid-flanged and having opposite axial end sections bearing upon respective ones of the two runway rails of the track, with the central flange riding in the slit intermediate the runway rails. Hangers extend from the traveller down through the slit and suspend a railway car, or the like. The traveller is provided with two linear motors, located to opposite sides of the traveller. Reaction rails, for example composed of a series of reaction bars, extend alongside the track and cooperate with the linear motors to cause the traveller to advance along the track. When the traveller comes to a switching region, one of the linear motors is deenergized so that the other will effect not only advancement of the traveller but will furthermore cause the traveller to be steered onto the selected branch of the switch. Above the level of the linear motors, the traveller is provided with horizontally spaced guide rollers rotatable about respective vertical axes. These guide rollers bear upon guide rails located at the level of the guide rollers and extending alongside the track. In the switching region there are provided steering rails which extend alongside the outer rails of the branch sections. The traveller is provided with a steering structure capable of engaging a selected one of the steering rails to effect steering by purely mechanical means, in the event of a partial or complete electrical power loss of the linear motor which would normally effect the steering action. Uptrack and down-track of the switching region, the reaction rails, the guide rails, and to their limited extent the steering rails are horizontally spaced from the respective track centerline by constant respective distances.

German published Pat. application DT-OS 2 164 078 discloses a structure for the suspension rail of a suspended railway. The suspension rail is mounted on supports and has a box-like cross-sectional profile encasing the traveller. The suspension rail is slotted at its bottom wall for the passage of the hangers which extend down from the traveller to support the suspended railway car. The travellers of the railway are provided with mid-flanged traveller wheels which ride down the middle of the two-runway-rail track. If the suspended railway cars follow each other closely and are to be routed onto different branches of a switch, then it is desirable to provide a switch which effects steering of the railway cars onto the selected branches without the need for moving parts such as switch blades, and the like. However, if conventional switch blades and the like are to be eliminated, there arises the problem of how to reliably effect the routing of the cars onto the different branches of the switch.

German published Pat. application DT-OS 2 215 807 proposes a solution to this problem. In the switching region, the suspension rail is provided with magnets located at the outer sides of the respective outer rails of the branch sections of the switch. The traveller is provided on its opposite sides with armature plates which can be selectively activated to move into the region of the magnetic field of the left-branch magnets or into the region of the magnetic field of the right-branch magnets. When the railway car approaches the switching region, one or the other of the armature plates is activated, with the result that the traveller of the railway car is caused to follow either the outer runway rail of the left branch or else the outer runway rail of the right branch, and in this way steering of the railway car is effected. In this publication, there is also disclosed the concept of providing steering rails alongside the steering magnets. The traveller is provided with a steering structure capable of hooking behind the steering rail of one of the other branch section, so that steering by purely mechanical means will occur in the event of a loss of the magnetic steering action, due to a partial or complete electric power loss. However, this known construction has a considerable disadvantage.

The central slit defined intermediate the two runway rails of the suspension railroad track spreads apart in the switching region to form a large empty space or switching gap. If for example the railway car is travelling on the stem section of the switch and is to be steered onto the right branch section, then, as the traveller of the railway car crosses the switching gap, the left traveller wheel sections will cross the gap unsupported from below. Because of the horizontal spacing, as considered in transverse cross-section, between the right-hand or load-bearing runway rail in this example, on the one hand, and, on the other hand, the center of gravity of the traveller and the suspended railway car, the traveller will tend to tilt to the left when crossing the switching gap, in passing from the stem section of the switch to the right branch section.

This tendency to tilt to the left is opposed by the attractive force of the aforementioned steering magnets running alongside the outer runway rail of the right branch section. However, as indicated above, in the event of a partial or complete power loss resulting in deenergization of the steering magnets, the steering becomes purely mechanical, with the hooked ends of a steering structure on the traveller hooking behind the steering rail which runs alongside the outer runway rail of the right branch section along the switching region. However, this latter steering action, which comes into play only in the event of the power loss, results in a limited tilting of the traveller to the left, due to the play between the right steering structure and the right steering rail. The presence of this play is appropriate, since it prevents the mechanical steering engagement from occurring except when the attractive steering force of the steering magnets fails. However, the problem produced by this action is that the unsupported left traveller wheel sections may assume a level below the level of the upper or bearing surface of the left runway rail of the right branch section, in this example, with the result that the unsupported left traveller wheel sections, instead of smoothly engaging the inner runway of the branch section after crossing the switch gap, instead collide with it.

German published patent application DT-OS 2 328 366 discloses another such suspended railroad suspension rail construction. There, the steering of the traveller, which is provided with a mid-flanged traveller wheel which rides down the center of the track defined by the two spaced runway rails, is effected by the separate control of linear motors located at opposite sides of the traveller and cooperating with respective reaction rails extending along opposite sides of the two-runway-rail track. Normally, both linear motors are energized, for effecting advancement of the traveller. When the traveller enters a switching region, one linear motor is deenergized, so that the linear motor which remains energized not only effects advancement, but furthermore causes the traveller to be attracted to the associated reaction rail. To stabilize the traveller against lateral tilting and swinging, there are provided at the top of the traveller guide rollers bearing upon lateral guide rails running along opposite sides of the track. When passing through the switch, the traveller wheel section associated with the deenergized linear motor is unsupported, resulting in the aforedescribed tendency of the traveller to tilt to the unsupported side. To counteract this tendency to tilt, the linear motor which remains energized is energized to a considerably greater extent than when both linear motors are energized simultaneously. The energization of the linear motor which remains energized to effect both advancement and tilting must be increased for still another reason. Specifically, one of the two branch sections of the suspension railway switch is a curved branch section, and accordingly the magnetic coupling between the linear motor and the reaction bars of the associated reaction rail is somewhat decreased if the traveller is passing along this curve. To compensate for this decrease, the energization of the linear motor which effects the steering must be still further increased. It is considered quite undesirable that as the traveller enters the switching region the energization of the linear motor which is called upon to effect the steering action must be increased so greatly and so relatively suddenly.

SUMMARY OF THE INVENTION

It is a general object of the invention to overcome the disadvantages of the prior-art constructions and expedients discussed above.

It is a more particular object to provide a novel suspended railway switch arrangement so designed that, if linear motors located on opposite sides of the traveller are employed as the principal steering means, the energization of the linear motor called upon to effect steering as the traveller enters the switching region can be increased continuously and relatively gradually.

It is another object of the invention to prevent collision between the unsupported traveller wheel sections and the runway rail onto which the unsupported traveller wheel sections are about to come into contact, in the event that the traveller tilts towards its unsupported side while crossing the switch gap; such tilting could occur for example in the event of a partial or complete electrical power loss of the linear motor called upon to effect the steering.

According to a preferred concept of the invention, this object, and other which will become more understandable from the description, below, of preferred embodiments, can be met by so designing the suspension rail that the reaction rails and guide rails which run alongside the runway rails, and also the steering rails which run alongside the runway rails only in the switching region, are horizontally spaced outwards from the respective track centerline by respective first distances up-track and down-track of the switching region and by larger respective second distances within the switching region, with these horizontal spacings changing continuously from the first distance to the second distance and back to the first distance, as one proceeds through the switching region. Preferably, the respective horizontal spacings of the reaction rails, guide rails and steering rails change identically as one proceeds through the switching region. In this way, as the traveller proceeds through the switching region, instead of tilting towards its unsupported side, it is positively caused to tilt in the opposite direction. This assures that, at the completion of the crossing of the switch gap, the unsupported traveller wheel sections will not be below the level of the bearing surface of the runway rail onto which they are about to come into contact.

The invention makes it possible to achieve any or all of the following advantages:

In the switching region, the suspension rail, ignoring the steering rails which are provided only in the switching region, is composed of essentially the same components as are present all along the suspension rail, i.e., up-track and down-track of the switching region. Additional heavy steering mechanisms, which may be expensive and very susceptible to malfunction, need not be used.

Furthermore, using only very simple means, it becomes possible to effect a relatively gradual increase in the energization of that one of the linear motors which is called upon to effect the steering through the switching region; this increases the lifetime of the linear motors and improves the quality of the ride.

Because the traveller, when crossing the switch gap, is positively tilted in direction away from the unsupported side thereof, the possibility of a collision between the unsupported traveller wheel sections and the runway rail upon which they come into contact at the completion of the crossing of the switch gap, is reliably precluded.

If there occurs a loss of electrical power for that one of the linear motors called upon to perform the steering as the traveller passes through the switching region, then, in order to optimize the contact relationship between the mid-flanged traveller wheel and the one of the runway rails upon which it bears, it is advantageous that the constant, maximum horizontal distance between the various rails and the respective track centerline in the switching region be so selected that in the event of such power loss the traveller will assume a vertical or plumb orientation.

It is considered desirable to minimize the electrical energization of the linear motor requisite for positively tilting the traveller in direction away from its unsupported side, as the traveller crosses the switch gap. To this end, the invention contemplates that the constant, maximum horizontal distance between the various rails and the respective track centerline, and in particular between the guide surfaces of the guide rails and the respective track centerline, in the region of the switch gap, be so selected that, in the event of a power loss of the linear motor responsible for steering, the traveller is permitted to tilt somewhat towards its unsupported side. If this be done, then it is considered advantageous to provide the various runway rails in the region of the switch gap with lead-on ramps. In the event that the unsupported traveller wheel sections are located below the level of the bearing surface of the runway rail upon which they come into contact at the completion of the crossing of the switch gap, then the lead-on ramp associated with such runway rail will gradually lift the unsupported traveller wheel sections up to the level of the bearing surface of the runway rail. Besides the saving of electrical energy which can result when this expedient is employed, there is created the possibility of taking into consideration, in advance, the wear of components of the traveller and of the suspension rail, particularly the steering bracket of the traveller and the steering rails of the suspension rail. Wear of these latter components could lead to an increase of the mechanical play between them and accordingly to the danger of a collision between the traveller wheels and the runway rails in the switching region. This results in a longer useful life of the components and longer intervals between service.

To achieve a flat abutment for the guide rollers upon the guide faces of the guide rails, and in order to optimize the cooperation between the linear motor and the reaction rails, it is contemplated to incline the guide surfaces of the guide rails and those faces of the reaction rails which face towards the respective linear motors by angles corresponding to the tilt which the traveller is to be caused to assume in passing through the switching region.

A problem may arise if the traveller is provided with brakes which could possibly collide with a runway rail as the traveller completes its crossing of the switch gap. For example, it is common to employ clamp brakes of the type comprised of two opposing members which, when the brake is activated, clamp between them one of the runway rails and the underlying section of the bottom wall of the suspension rail housing. If for any reason the clamp brake associated with the unsupported side of the traveller is in activated condition as the traveller crosses the switch gap, then the two opposing members of the clamp brake will be in direct contact or else spaced apart a distance less than the combined thickness of the runway rail and the underlying section of the bottom wall of the suspension rail housing. As a result, the clamp members of the clamp brake may impact upon the runway rail onto which the associated unsupported steering wheel section comes into contact at the completion of the crossing of the switch gap. To prevent this, the invention contemplates providing wedge-like spreading means operative for spreading apart such activated clamp members as the latter approach the runway rail at the end of the crossing of the switch gap. Advantageously, these spreading means can have the form of the aforedescribed lead-on-ramps for the runway rails, but sloping not only on their upper sides but also on their lower sides, to present a wedge-like leading end.

As indicated above, it is deemed advantageous to so design the steering bracket on the traveller and the steering rails of the suspension rail switch that physical engagement between the bracket and the selected steering rail actually occurs only if there is a partial or complete power loss of the linear motor called upon to steer in the selected direction. To minimize the frictional wear resulting when such actual physical engagement occurs, it is advantageous to provide bearing rollers at the ends of the steering bracket. When the traveller is to be steered onto one of the branch sections of the switch, the respective end of the steering bracket, upon which is mounted a bearing roller, hooks behind the associated steering rail. However, the bearing roller actually bears upon the bearing surface of the steering rail only in response to the tilting which occurs when there is a partial or complete loss of the power for the energized one of the linear motors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

In the several embodiments, the same reference numerals are employed to designate corresponding parts. The embodiment depicted in FIGS. 1–3 will be discussed first.

Figure 1:
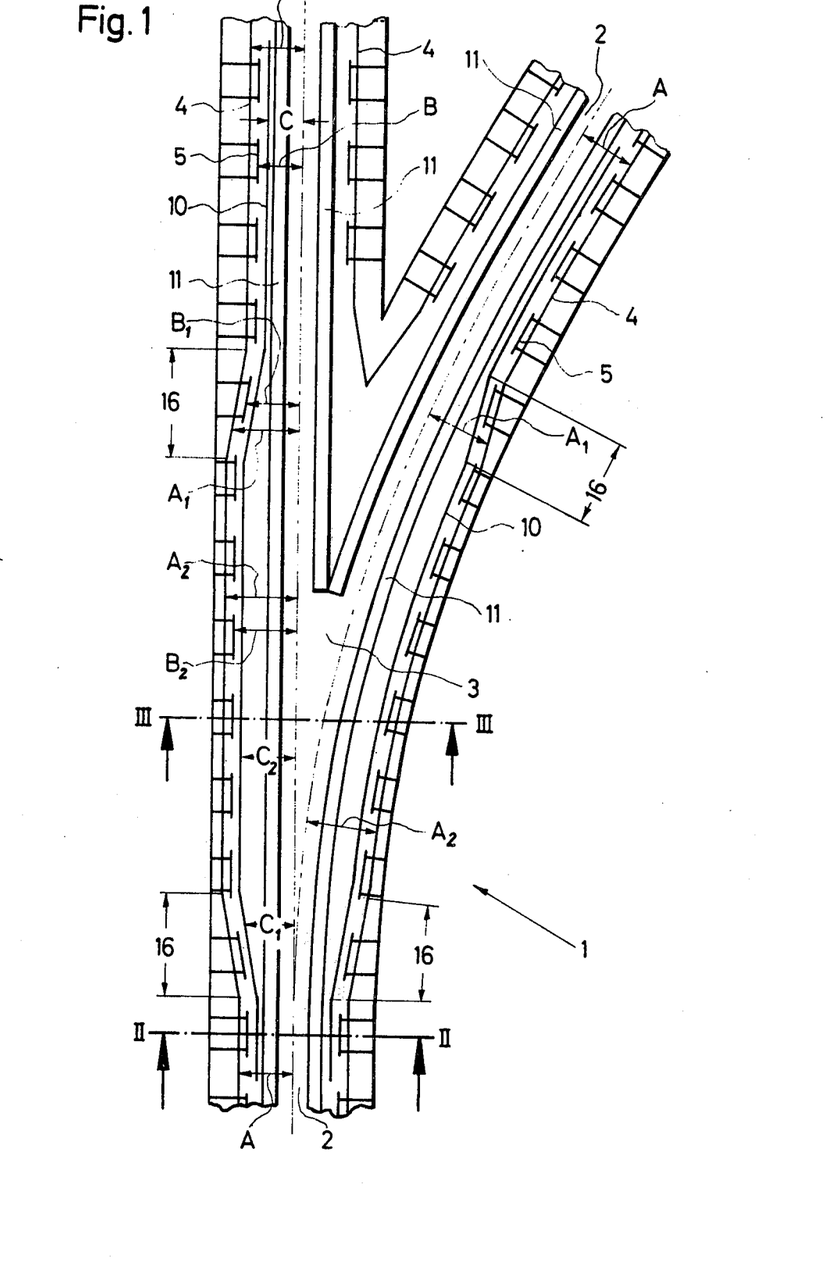
FIG. 1 is a schematic top view of a suspension rail switch, with the top wall of the suspension rail housing removed.
Figure 2:
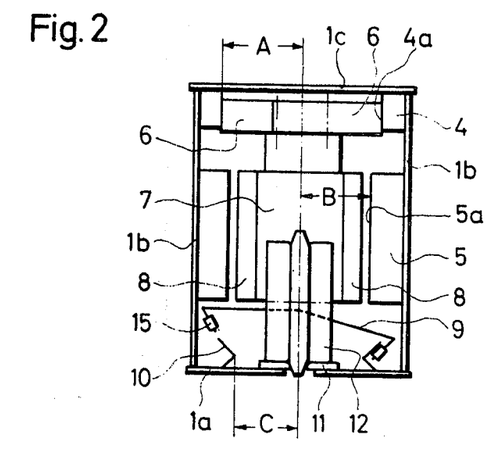
FIG. 2 is a section through the structure of FIG. 1, taken on line II—II, on a larger scale.

FIG. 2 is a transverse cross-section through a suspension rail 1 of a suspension railway. The suspension rail 1 is of generally box-shaped cross-section and is comprised of a bottom wall 1a, two side wall 1b and a top wall 1c. In FIG. 1, the top wall 1c is removed for clarity. The bottom wall 1a (FIG. 2) is provided with a central longitudinally extending slit 2. Just above the slit 2, to the left and to the right of the slit 2, there are provided left and right runway rails 11. Riding on the runway rails 11 are the two axially spaced bearing surfaces of two mid-flanged traveller wheels 12. The two traveller wheels 12 support the traveller 7 and are located spaced apart, one after the other, so that only one of the two traveller wheels 12 is visible in FIGS. 2 and 3. The traveller 7 carries two (non-illustrated) hangers which extend downwards from the traveller 7, fore and aft of the traveller, through the slit 2, to the top of a (non-illustrated) passenger car, or the like, which the (non-illustrated) hangers support.

The suspension rail 1 is furthermore comprised of steering rails 10 having an angled cross-sectional configuration. The steering rails 10 are provided not along the full length of the suspension rail 1, but instead only in the vicinity of the track switch, as seen particularly clearly in FIG. 1. The portions of the steering rails 10 located farthest from the actual switching vicinity are horizontall spaced a distance C from the respective track centerline (shown in dash-dot lines in FIGS. 1–3). Mounted on the traveller 7 is a pivotable steering bracket 9 which carries at its opposite ends rotatably mounted rollers 15. The rollers 15 cooperate with the steering rails 10 in a manner described in detail below.

Each of the two side walls 1b of the stationary suspension rail 1 is provided with respective reaction rails composed of successive discrete ferromagnetic bars 5 (see FIG. 1). The reaction bars are stationary and cooperate in per se known manner with respective ones of two linear motors 8. The linear motors 8 are mounted on either side of the traveller 7. The reaction bars 5 have vertical faces 5a which face inwards towards the traveller 7. These vertical faces 5a, outside the switching vicinity, are horizontally spaced from the respective track centerline (shown in dash-dot lines in FIGS. 1–3) by a constant distance B.

The suspension rail 1 (see FIG. 2) is provided at its upper corner portions with elongated guide rails 4. Outside the switching vicinity, the vertical guide surfaces 4a of the guide rails 4 are each horizontally spaced from the respective track centerline by a constant distance A. The traveller 7 is provided at its top with two guide rollers 6. Each of the guide rollers 6 has a diameter greater than the aforementioned distance A, and the guide rollers 6 are arranged on the top of the traveller T, one after the other, laterally offset with respect to each other, so that normally the left guide roller 6 bears against the left guide surface 4a, whereas the right guide roller 6 bears against the right guide surface 4a. The guide surfaces 4a and cooperating guide rollers 6 cooperate to counteract tilting of the (non-illustrated) passenger car, or the like, suspended from the traveller 7, particularly for example when the traveller 7 and the suspended passenger car is travelling at high speed around a bend. The guide rollers 6, being located considerably above the level of runway rails 11, are provided at the end of a relatively long lever arm and accordingly are capable of resisting considerable tilting forces.

Referring to FIG. 1, the leftmost runway rail 11 extends in an uninterrupted straight line through the switching region, extending through the straight portion of the switch in suspension rail 1. In contrast, the rightmost runway rail 11 curves off to the right, following the course of the switch branch. Down-track of the switch gap 3 (i.e., above switch gap 3, as viewed in FIG. 1) there is provided in the straight portion of the switch the right-side runway rail 11 of the straight portion, and there is provided in the curved portion of the switch the left-side runway rail 11 of the right branch section. The right-side runway rail 11 of the left branch section of the switch and the left-side runway rail 11 of the right branch section ofthe switch meet in the region of the switch gap 3 to form a branching point.

Up-track of the switch gap 3 (i.e., below the switch gap 3 as viewed in FIG. 1), in the up-track region 16, the horizontal spacing of the guide surfaces 4a from the track centerline has no longer the constant value A, but instead has a value $A_1$ which continuously increases in the down-track direction until, just down-track of the up-track section 16, the horizontal spacing reaches the maximum value $A_2$. Intermediate the up-track section 16 and the down-track sections 16, the value of this horizontal spacing remains constant at this maximum value $A_2$.

The horizontal spacing between the respective track centerlines and the facing surfaces 5a of the reaction bars 5 changes from the constant minimum value B, to the continuously increasing values $B_1$, to the constant maximum value $B_2$, in correspondence to the spacings A, $A_1$, $A_2$ in the track sections just mentioned. Likewise, the horizontal spacing between the respective track centerlines and the steering rails 10 changes in value from the constant minimum C, to the increasing value $C_1$, to the constant maximum $C_2$, proceeding in down-track direction to the switching region.

Accordingly, the rightmost and leftmost guide surfaces 4a, reaction bar surfaces 5a and the steering rails 10 are parallel to each other all the way through the switching region. In the matching of these spacings, there is taken into account the tilted position which the traveller 7 is to assume in passing through the switch region as a result of the spacings $A_1$ and $A_2$ between the guide surfaces 4a and the track centerline.

In FIG. 2, the steering bracket 9 is shown pivoted into its steer-to-the-right position. In this position, as the roller 15 on the right end of the steering bracket 9 reaches the up-track end (lower end as viewed in FIG. 1) of the right branch steering rail 10, the right roller 15 will hook itself behind (i.e., to the outside of) the right steering rail 10, as shown in FIG. 2. This hooking of the right roller 15 behind the right steering rail 10, which occurs with slight play, serves two purposes. Firstly, in the event that the right-side linear motor 8 (energized while the left-side motor 8 is deenergized, to effect steering onto the right branch section) becomes deenergized, then the steering bracket 9 with its right roller 15 will cooperate with the right steering rail 10 to serve as the principal steering means for the traveller and suspended car. Secondly, in the event of such partial or complete electrical power loss, the tendency of the traveller 7 to tilt to the side of the unsupported traveller wheel section, normally counteracted by the magnetic attraction between the energized one of the linear motors and the associated reaction rail, is instead counteracted by the interengaged roller 15 and steering rail 10.

Figure 3:
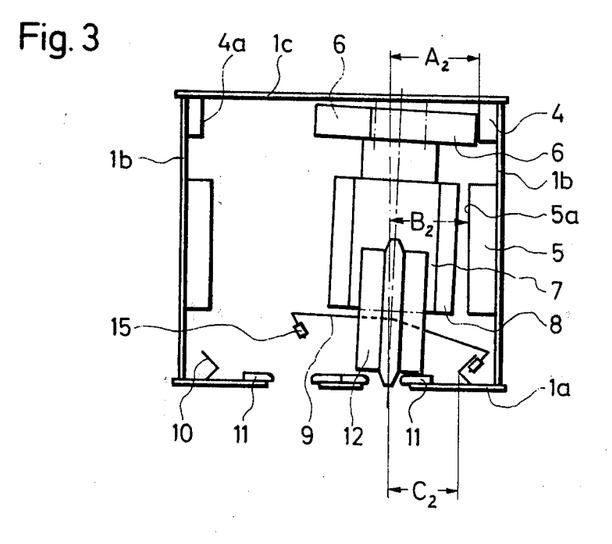
FIG. 3 is a section through the structure of FIG. 1, taken on line III—III, on a larger scale.

As the traveller 7 travels down-track (upwards in FIG. 1) through the up-track section 16, the orientation of the traveller 7 is caused to change from plumb or vertical (FIG. 2) to tilted, in consequence of the increasing distance between the respective track centerline and the rails 4, 5 and 10. The greatest tilt is enforced when the traveller 7 is located intermediate the up-track and down-track sections 16, as it is being steered onto the branch track; this greatest tilt is depicted in FIG. 3. As the traveller 7 travels through the down-track section 16 of the branch track, the orientation of the traveller 7 is gradually caused to change from tilted back to plumb or vertical, in consequence of the decreasing distance between the respective track centerline and the rails 4, 5 and 10, and the left ends of the two mid-flanged traveller wheels 12 are gradually lowered down onto the left runway rail of the right branch section. As this occurs, the left linear motor 8 is reenergized, and the energization of the right linear motor 8 is reduced somewhat back to its normal value. During the passage of the traveller onto the right branch section of the switch, if the rightside linear motor 8, responsible for effecting both the steering to the right and also the forwards driving of the traveller 7, should become deenergized, for example as a result of a partial or complete power loss, then the right roller 15 will move slightly leftwards and bear upon the right steering rail 10. This will maintain the traveller 7 properly tilted to the right so that, if the traveller 7 continues to advance, the left ends of the traveller wheels 12 will not impact upon the leading end of the left runway rail 11 of the left branch section, but instead will be gradually lowered down into contact with the upper or bearing face of the left runway rail down-track of the leading end of the left runway rail.

Figure 4:
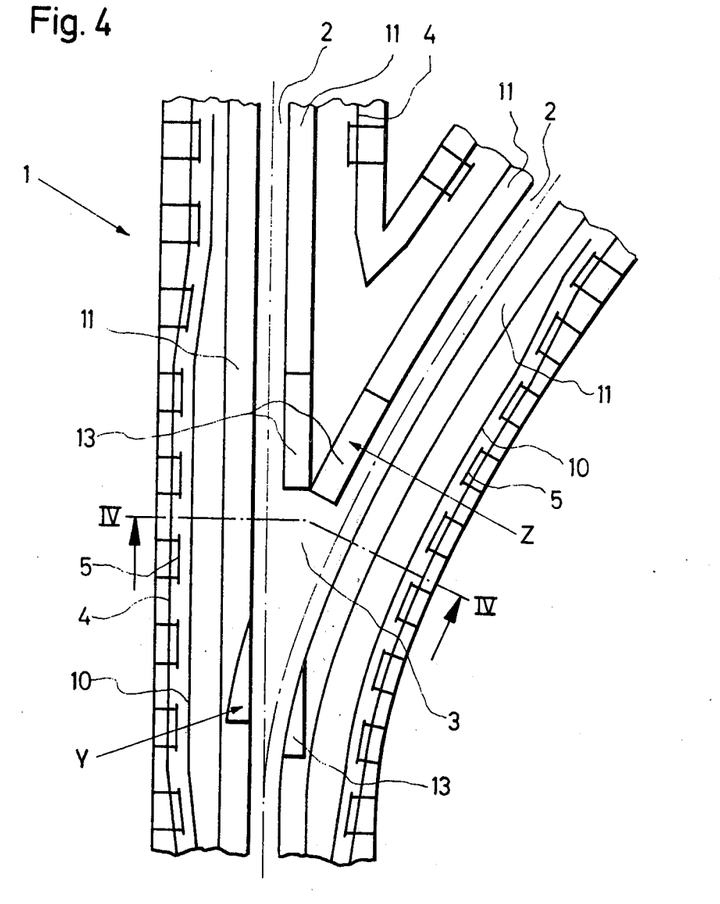
FIG. 4 is a schematic top view of another suspension rail switch, corresponding to the view of FIG. 1, but on a larger scale.
Figure 6:
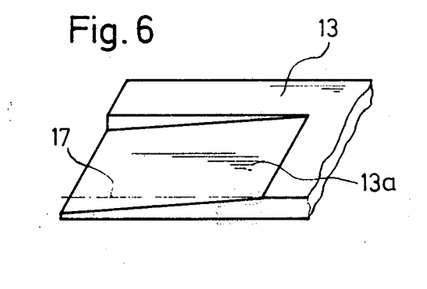
FIG. 6 is a perspective view of the lead-on ramp located at Z in FIG. 4, on a scale larger than that of FIG. 4.
Figure 7:
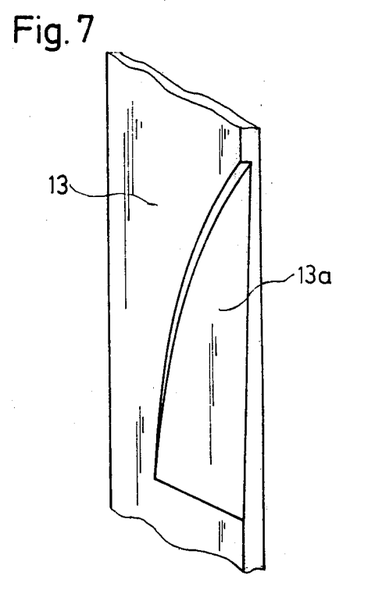
FIG. 7 is a perspective view of the lead-on ramp located at Y in FIG. 4.

The embodiment depicted in FIGS. 4-7 corresponds to that of FIGS. 1-3, with the following differences:

There are depicted in FIGS. 4, 6 and 7 ramps 13 having upper sides 13a which slope upwards in downtrack direction (in the direction from the bottom to the top of FIG. 4). These ramps 13 merge into respective ones of the runway rails 11.

If a power loss occurs when the traveller 7 is crossing the switch gap 3, for example passing from the stem section to the right branch section of the switch, then, as indicated above, the traveller 7 hitherto positively tilted to the right by the linear motor 8, will tilt somewhat to the left relative to the vertical, until the right steering roller 15 comes into bearing engagement upon the outer side of the right steering rail 10. Accordingly, although there will still be a positive steering action, and also resistance to unlimited tilting to the left, there will again arise the possibility that the left bearing surface of the traveller wheel 12 will impact upon the leading end of the left runway rail 11 of the right branch section of the switch. The ramps 13 prevent such impact from occurring, by accepting the unsupported traveller wheel sections, even if they are below the level of the bearing surface of the runway rail 11, and gradually raising the unsupported traveller wheel sections up to the level of the runway rail bearing surface.

Figure 5:
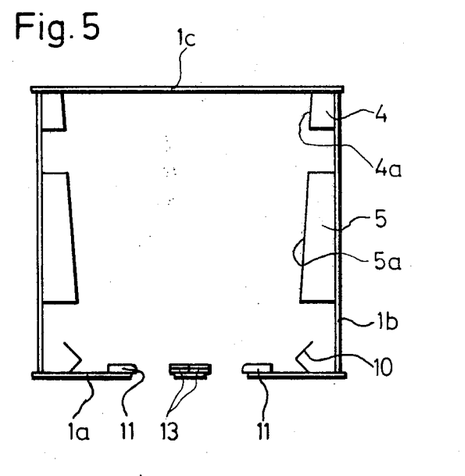
FIG. 5 is a section through the structure of FIG. 4, taken on line IV—IV.

FIG. 5 depicts the expedient of providing the guide surfaces 4a of the guide rails 4 and the facing sides 5a of the reaction bars 5 inclined relative to the vertical by an angle corresponding to the tilt which the traveller 7 is to assume when crossing over the switch gap 3.

Figure 8:
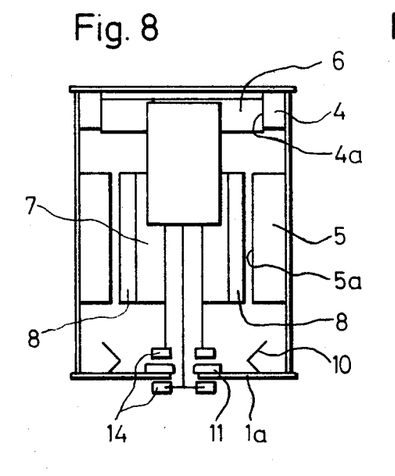
FIG. 8 is a section through a suspension rail corresponding to the sectional view of FIG. 2, but provided to show the arrangement of a pair of opposing-member clamp brakes provided on the traveller.

In FIG. 8, the suspension rail is generally of the same construction as before. However, the traveller 7 is provided with two jointly activatable clamp brakes 14. Each clamp brak 14 includes two opposing clamping members. When a clamp brake 14 is activated, the two opposing members move towards each other, clamping between them the associated runway rail 11 and the underlying portion of the bottom wall 1a of the suspension rail 1.

Figure 9:
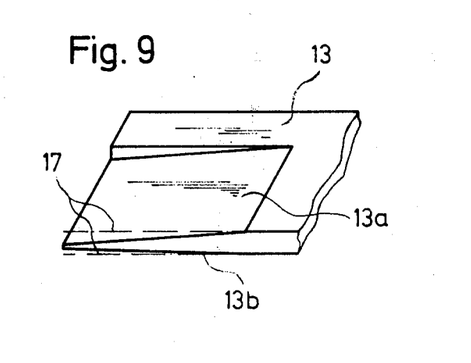
FIG. 9 depicts another lead-on ramp.

If the clamp brakes 14 are for any reason in activated condition as the traveller 7 crosses the switch gap 3, then the two opposing members of the clamp brake 15 associated with the unsupported side of the traveller will directly engage each other, or will be spaced apart a distance less than the spacing which they assume when they are separated by the combined thickness of a runway rail 11 and the underlying portion of the bottom wall 1a of the suspension rail 1. Accordingly, at the completion of the crossing of the switch gap 3, it could undesirably occur that an activated clamp brake 14 would impact against the runway rail onto which the unsupported traveller wheel section is about to come into contact. To prevent this, the ramps 13 can be sloping not only at their upper sides 13a but also at their lower sides 13b (see for example the ramp 13 shown in FIG. 9). In this way, the ramps 13 act like wedges which pry apart activated clamp brakes 14 crossing the switch gap 13, to prevent damage to the clamp brakes 14 and to the runway rails.

Figure 10:
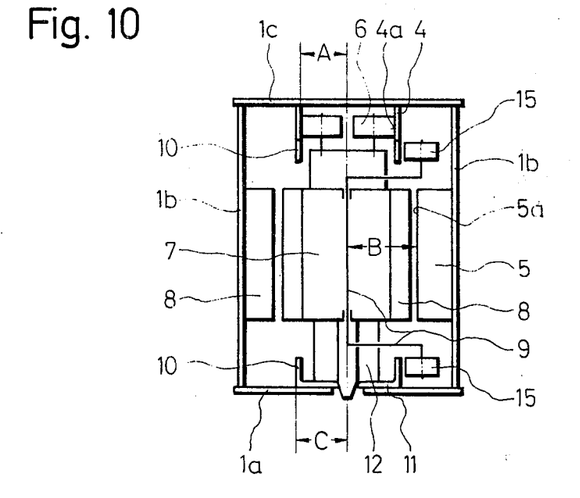
FIG. 10 is a section through another suspension rail, corresponding to the sectional view in FIG. 2.
Figure 11:
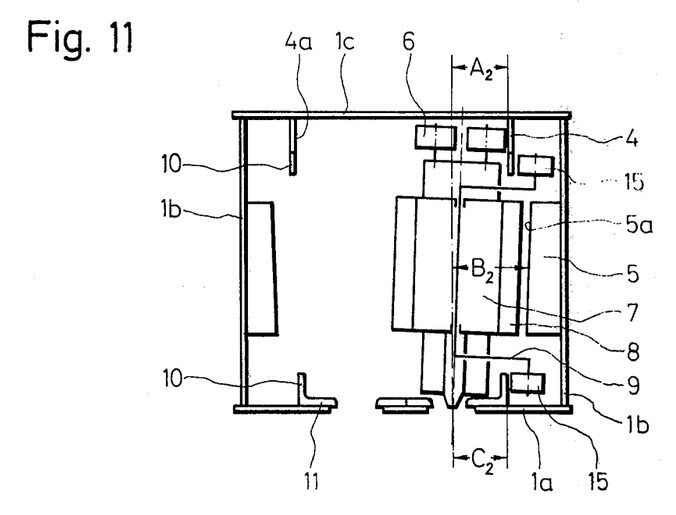
FIG. 11 is a section through the suspension rail of FIG. 10, corresponding to the sectional view of FIG. 3.
Figure 12:
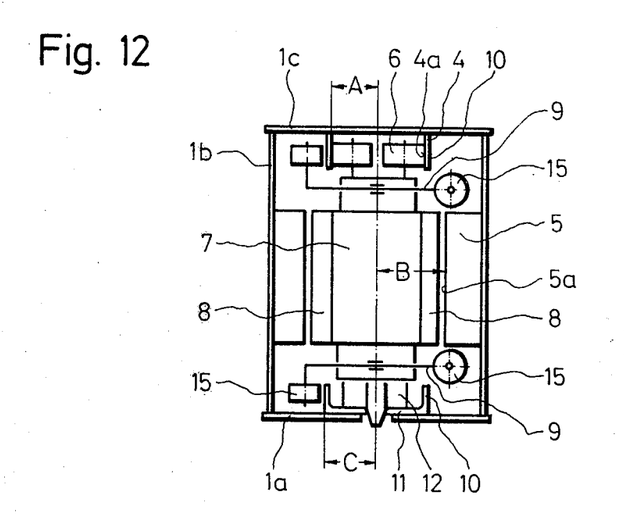
FIG. 12 is a section through a further suspension rail, corresponding to the sectional view in FIG. 2.

The construction of the suspension rail 1 in FIGS. 10-12 is for the most part the same as already described with respect to FIGS. 1-3. FIGS. 10 and 11 respectively correspond to FIGS. 2 and 3, i.e., to sections through FIG. 1 taken on lines II—II and III—III. FIG. 12 corresponds to FIG. 3, i.e., to a section through FIG. 1 taken on line III—III. Other views of these two additional embodiments are not necessary, because of the analogy to FIGS. 1—3.

The embodiment of FIGS. 10 and 11 differs from that of FIGS. 1—3 in that steering rails 10, present in the switching region only, are located both above and below the traveller 7. There are provided two upper steering rails 10 and two lower steering rails 10. The upper steering rails 10 are formed as lower integral extensions of the guide rails 4, whereas the lower steering rails 10 are formed as upwardly projecting, angled, integral extensions of the runway rails 11. Instead of the single steering bracket 9 of FIG. 1, there are present in the embodiment of FIGS. 10 and 11 two steering brackets 9. The upper steering bracket 9 is provided with a bearing roller 15 having a generally vertical rotation axis. The upper steering bracket 9 is pivotable about a vertical axis which intersects the track centerline. In the steer-to-the-right position of the upper steering bracket 9, the bearing roller 15 hooks behind the right upper steering rail 10. In the steer-to-the-left position of the upper steering bracket 9, the bearing roller 15 hooks behind the left upper steering rail 10. The construction and positions of the lower steering bracket 9, with the lower bearing roller 15, are analogous. As before, when the bearing rollers 15 hook behind the respective steering rails 10, they are spaced from the steering rails or else engage them with some play; the bearing rollers 15 bear with full force against the bearing surface of steering rails 10 only in the event of a partial or complete electrical power loss, in which event the anti-tilting force of the energized linear motor 8 ceases, and must be provided by the interengaged steering brackets 9 and steering rails 10 which safeguard the traveller and the suspended railway car until the latter come to a standstill.

In the embodiment of FIG. 12, there are again provided two upper steering rails 10 and two lower steering rails 10. In FIG. 12, the upper steering rails 10 are provided at the outer sides of the guide rails 4, or may even be constituted by the outer portions of the guide rails 4 if desired. In FIG. 12, as in FIGS. 10 and 11, the lower steering rails 10 are provided as upwardly projecting, integral extensions of the runway rails 11. A before, the lower steering rails 10 are provided only in the switching region.

There are again provided upper and lower steering brackets 9. The upper steering bracket 9 has three mutually perpendicular arms and is pivotable about horizontal axis coincident with the middle arm, th middle arm being journalled in a journallocated in th vertical plane of the track centerline. The left and righ arms of the upper steering bracket 9, as viewed in FIG 12, respectively extend vertically upwards and nor mally outwards from the picture plane. These left an right arms carry respective bearing rollers 15 whic engage the upper steering rails 10 in a manner simila to that already described with respect to the other embodiments. As shown in FIG. 12, the upper steering bracket 9 is in the steer-to-the-left position, with the left bearing roller 15 hooked behind the upper left steering rail 10. To move the upper steering bracket 9 into the steer-to-the-right position, it is necessary to swing the rotation axis of the right roller 15 to the vertically upwards projecting position. The structure and positions of the lower steering bracket 9 are analogous, and as before the two steering brackets 9 are jointly activatable.

It will be understood that each of the elements described above, or two or more together, may also find a useful application in other types of constructions differing from the types described above.

While the invention has been illustrated and described as embodied in a suspension railway using suspension rails of the type wherein two runway rails are borne upon by the opposite end sections of one midflanged traveller wheel, instead of two distinct, laterally spaced traveller wheels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and described to be protected by Letters Patent is set forth in the appended claims.

1. In a suspended railway of the type employing a suspension rail provided with two runway rails upon which respectively ride the first and second traveller wheel sections of a traveller from which a railway car, or the like, is suspended, a railway switch therefor, the switch having a stem section and two branch sections, each of the two runway rails of the stem section being also the outer runway rail of a respective one of the two branch sections; each of the two branch sections furthermore having a respective inner runway rail, the inner runway rails of the two branch sections defining together with the outer runway rails a switch gap over which one of the traveller wheel sections crosses unsupported as the traveller crosses the switch gap so that in crossing the switch gap the traveller exhibits a tendency to tilt in a first direction towards the side of the unsupported traveller wheel section; and means for positively causing the traveller to tilt in the opposite second direction when crossing the switch gap to assure that at the completion of the crossing of the switch gap the unsupported traveller wheel section will not be below the level of the runway rail onto which it is about to come into contact.

2. In a suspended railway as defined in claim 1, wherein the means for positively causing the traveller to tilt in the second direction when crossing the switch gap comprises elongated guide means extending along the outer runway rails and operative for constraining the traveller to travel along the guide means with a portion of the traveller spaced a predetermined lateral distance from the guide means, and wherein the elongated guide means are laterally spaced a first predetermined distance from the track centerline up-track and down-track of the switch gap but in the region of the switch gap laterally spaced from the track centerline a different second distance such as to cause the traveller to tilt in the second direction when crossing the switch gap.

3. In a suspended railway as defined in claim 2, the traveller being provided with two linear motors, one located to either side of the traveller, and wherein the elongated guide means comprises reaction rails extending alongside the outer runway rails and each cooperating with a respective one of the two linear motors.

4. In a suspended railway as defined in claim 3, wherein the elongated guide means additionally comprises guide rails running alongside the runway rails spaced vertically from the level of the runway rails, and wherein the guide rails running along the outer runway rails are laterally offset from the respective track centerline a first distance up-track and down-track of the switch gap but in the region of the switch gap laterally offset from the respective track centerline a different second distance constraining the traveller to assume a predetermined tilt as it crosses the switch gap.

5. In a suspended railway as defined in claim 2, wherein the elongated guide means are laterally spaced a first predetermined distance outwards from the respective track centerline up-track and down-track of the switch gap but in the region of the switch gap laterally spaced from the track centerline by a greater second distance.

6. In a suspended railway as defined in claim 5, wherein the lateral outwards spacing of said guide means from the respective track centerline changes continuously from said first predetermined distance to said second predetermined distance.

7. In a suspended railway as defined in claim 1, the traveller being provided with two linear motors located to either side of the traveller, the motors being separately regulatable for causing the traveller to advance along reaction rails extending along the track and in the switching region to follow the path of the selected reaction rail, the traveller being provided with a steering bracket operative in the event of an electric power loss of the linear motors for engaging a steering rail extending alongside the selected reaction rail to prevent loss of steering of the traveller, and the traveller being provided at its top with horizontally spaced guide rollers rotatable about respective vertical axes and adapted to follow guide rails extending alongside the track at the level of the guide rollers, and wherein the means for positively causing the traveller to tilt in the second direction when crossing the switch gap comprises reaction rails extending along the outer runway rails and each cooperating with a respective one of the two linear motors, guide rails extending along the outer runway rails at the level of the guide rollers for guiding the guide rollers, and steering rails extending along the outer runway rails from locations up-track of the switching region to down-track of the switching region, the horizontal spacing of the reaction rails, guide rails and steering rails from the track centerline at a first location up-track of the switching region having constant respective first values and at a second location in the switching region having constant and larger respective second values and intermediate the first and second locations having respective values continuously increasing by identical amounts from the respective first to the respective second values, the first, second and intermediate values being such as to constrain the traveller to tilt in the second direction to a predetermined extent when crossing the switch gap.

8. In a suspended railway as defined in claim 7 wherein the horizontal spacing of the guide rails relative to the respective track centerline intermediate said first and second locations is such as to cause the traveller to assume a vertical orientation in the event of an electrical power loss of the linear motors.

9. In a suspended railway as defined in claim 7, wherein the horizontal spacing of the steering rails relative to the respective track centerline intermediate the first and second locations is such as to cause the traveller to assume a vertical orientation in the event of an electrical power loss of the linear motors.

10. In a suspended railway as defined in claim 7, wherein the horizontal spacing of the steering rails at the second location is so selected that in the event of a power loss of the linear motors the traveller tilts in the first direction, and wherein at least one of the runway rails in the switching region is provided with a ramp portion onto which the unsupported traveller wheel section of the traveller gradually comes int contact as the traveller crosses the switching gap.

11. In a suspended railway as defined in claim 7, wherein the inner faces of the guide rails and the inner faces of the reaction rails are inclined with respect to the vertical by substantially the angle of the tilt which the traveller is caused to assume by said means when crossing the switch gap.

12. In a suspended railway as defined in claim 7, the traveller being provided with at least two clamp brakes, each clamp brake being associated with one of the two runway rails upon which the traveller wheel sections ride, each clamp brake being comprised of two opposing members which when the clamp brake is activated move towards each other from above and below the associated runway rail, whereby if the clamp brake associated with the unsupported traveller wheel section is activated while the traveller is crossing the switch gap the two opposing members thereof will move into proximity with each other, and wherein at least one of said runway rails is provided in the switching region with spreading wedge means operative for spreading apart the clamping members of an activated clamp brake as such clamping members approach the runway rails, whereby to prevent impact of the clamping members of the activated clamp brake upon such runway rail as the traveller crosses the switch gap.

13. In a suspended railway as defined in claim 7, the steering bracket on the traveller being provided at its opposite ends with bearing rollers, and wherein said steering rails are provided with bearing surfaces upon which the bearing rollers bear and along which they roll in the event of a power loss of the linear motors.

* * * * *